UNITED STATES PATENT OFFICE.

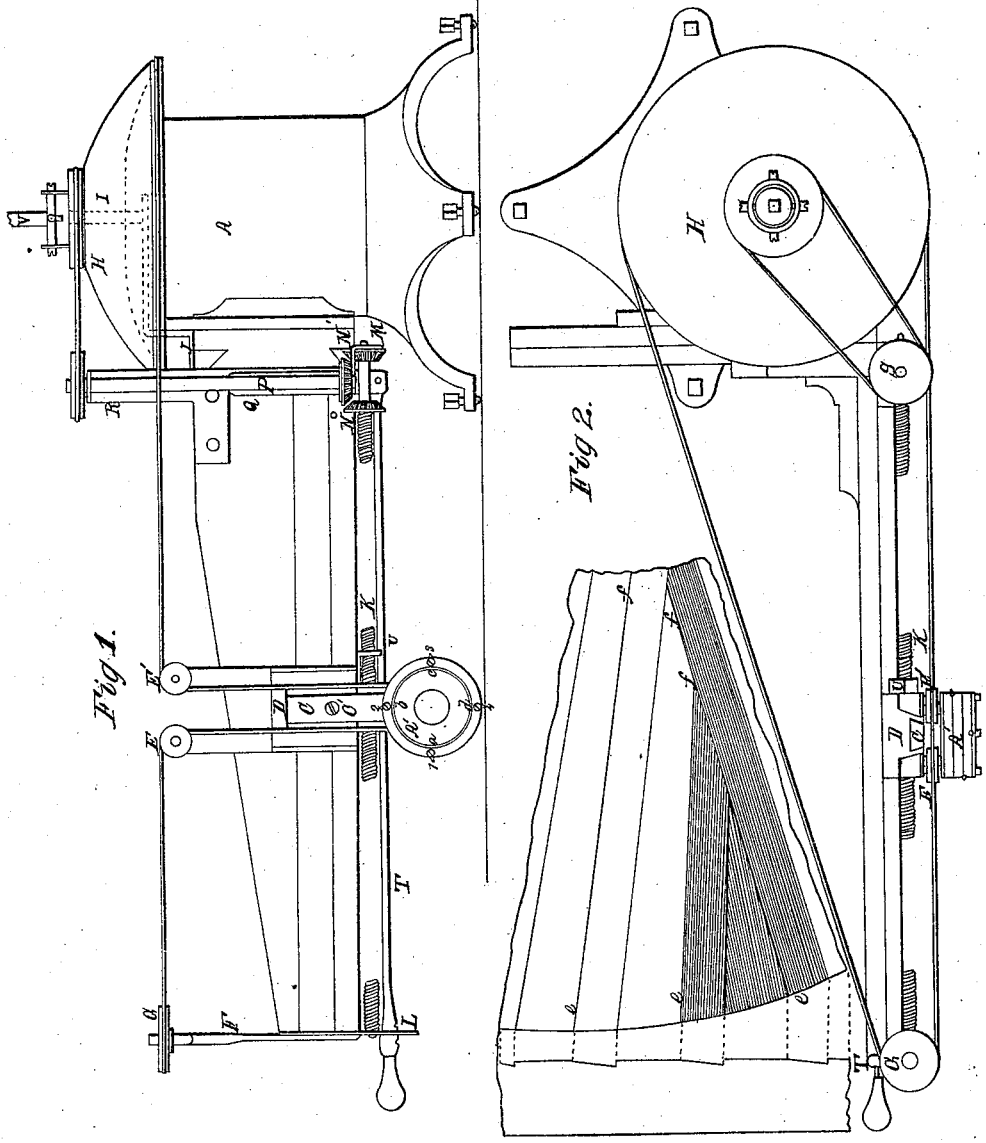

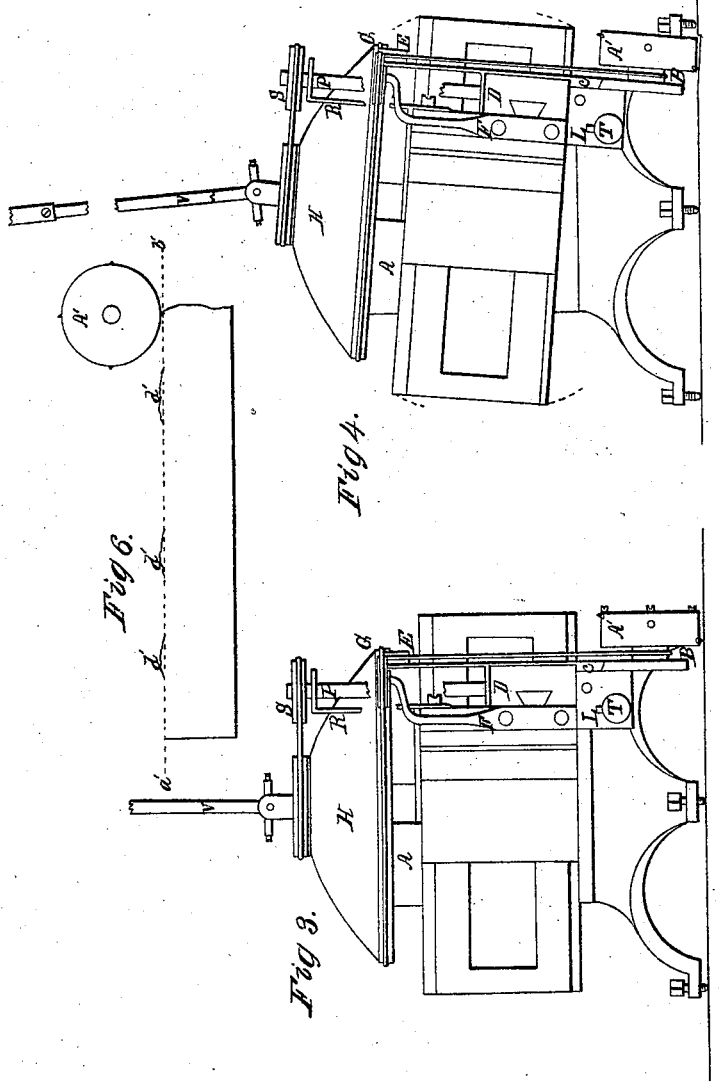

JAMES T. GILMORE, OF PAINESVILLE, OHIO.

IMPROVEMENT IN MACHINERY FOR DRESSING OR WORKING STONE.

Specification forming part of Letters Patent No. 38,670, dated May 26, 1863.

*To all whom it may concern:*

Be it known that I, JAMES T. GILMORE, of Painesville, in the county of Lake and State of Ohio, have invented a new and Improved Mode for Dressing or Working Stone, particularly such as are of a hard or compact nature, as burr, granite, &c.; and I do hereby declare that the following is a full and exact description thereof, reference being had to the accompanying drawings, numbered consecutively 1, 2, 3, 4, 5, and 6, and to the letters of reference marked thereon, which fully explain the construction and mode of operating my said invention, as well as the manner of attaching the same to my machine for dressing millstones, for which a patent was granted to me on the 28th day of October, 1862.

My invention consists in the employment of a diamond or diamonds, or other hard cutting-points, placed on the periphery or sides of a wheel or disk, or anything equivalent thereto, and operating said wheel or disk at any required speed, by rotary motion, or by rotary, rectilinear, and reciprocating motion simultaneously applied, for the purpose of cutting or dressing stone, the primary object being to apply it to the cutting or dressing of stone of a hard or compact nature, as burr, granite, &c., difficult of manipulation by the ordinary modes of working.

A secondary feature of my said invention is its capability of working stone or marble of the ordinary degree of hardness with accuracy and dispatch.

Under the first application of my invention I would enumerate cutting or preparing burr-blocks in the manufacture of millstones, and for surfacing the same for receiving the "dress;" for laying out or cutting the main and subordinate furrows, or other lines, of any required dress; also, for new-surfacing a millstone for receiving a new dress by removing or effacing the old dress. Secondly, in the preparation of stone or marble for building or other purposes, as facing the planes of blocks, fluting columns, cutting sunk or raised rectilinear forms, as round and hollow moldings, &c.

I will now proceed to describe the construcion and operation of my said invention, premising that the drawings show, as before stated, the application of the principle of my said invention as connected with my said patented millstone-dressing machine. The arrangement of mechanical parts which operate and control the cutting-wheel as therein employed is, for all the purposes claimed, essentially the same, as, in adapting it to any of the said purposes, no alteration is needed in operating the said cutting-wheel, beyond the employment of the usual and common modes of framing, shafting, and gearing, to suit position and location.

A', Fig. 1, is a wheel. This can be made of any required diameter or width. On the periphery of said wheel are placed the cutters, and as I prefer diamond-points, my present description relates to the employment of such. If a number of points are used they can be arranged as I have shown in the drawings, where it will be seen four of such points are placed in positions indicated by the Figs. 1, 2, 3, and 4, and occupying spaces on the breadth of the wheel, as shown in Fig. 2. The diamond-points are set in the usual mountings or sockets, and are secured in the wheel by any suitable method, such as by tightening-screws, $a$, $b$, $c$, and $d$, Fig. 1. The said wheel A', on which is a pulley, B, Fig. 3, is supported on a spindle set in a dovetailed sliding arm, C Fig. 1, which operates in a corresponding groove in the slide-block D, so that said arm can be moved up or down, and then secured in place by the tightening-screw C'. The said slide-block is the same as that used in my said patented machine, and marked $e$ in Fig. 1 in the specification thereof.

E E' are pulleys placed on supports secured to the said slide-block. At the extreme end of the arm of my said patented machine is secured the support F, which sustains a pulley, G.

H is a larger pulley supported on a spindle, I, secured to the support J. Said pulley, it will be seen, operates the cutter-wheel A' by giving motion to the other pulleys before mentioned. This pulley H has no support but that which is connected to the before-mentioned arm, and is therefore independent of the body or hollow journal A of my said patented machine, and is therefore free from contact with it in the various movements or positions of the said arm.

My description thus far relates to the operating of the cutter-wheel by rotary motion, subject to the controlling movements of the said arm, as stated.

I will now describe the manner of operating the said cutter by rectilinear motion, and the manner of making such motion reciprocating: In the first place, a long screw, K, with suitable pitch, is supported on hangers L and M, placed on opposite ends of the arm before mentioned. On one end of said screw are placed two small beveled cog-wheels, N N'.

O is a similar wheel, secured on a shaft, P. Said shaft rests in a step attached to a vibrating hanger, Q, the upper portion of the said shaft being held in a support, R. Said shaft is connected by its pulley S with the driver-pulley H, before mentioned.

T is a shipper-rod attached to the vibrating hanger Q, and is extended beyond the end of the arm before mentioned for convenience of using.

U is a nut fastened to the slide-block D, and connecting it with the long screw K. The said nut is in two parts, and opens and closes by a hinge arrangement for the purpose of disconnecting the said slide-block from the screw K, as will be shown.

On the upper part of the driver-pulley H is a coupling arrangement on the principle of the universal joint. Its construction is clearly seen by reference to Figs. 1 and 2, and needs no especial description. It will be sufficient to state that the arrangement is to allow the shaft V, Fig. 4, which communicates the power to the driver-pulley H, to rotate, when by the horizontal or the oblique movement of the arm it becomes inclined, as seen in Figs. 2 and 4. The upper end of said shaft is of course provided with a similar coupling. The shaft can also be lengthened or shortened by having it in two parts, one part being hollow and the other sliding into it and secured by a tight screw, for the convenience of reaching the position or location of the driving-power when adjusting the machine to different localities.

The mode of rotating the cutter-wheel has been already mentioned. The rectilinear and reciprocating motion is effected thus: Motion being given to pulley S of shaft R, which, by meshing its bevel-wheel O with bevel-wheel N, rotates the screw K, and by means of the hinged nut U the slide-block D is moved along its length. This motion is made reciprocating by means of the shipper-rod I, meshing the said bevel-wheel O alternately into the bevel-wheels N and N'. If it is desired to have the slide-block D move independent of the screw arrangement, so as to operate it by hand, the nut U, which is divided and hinged, as before mentioned, can be opened, and thus disconnect the said slide-block from the screw. The cutter-wheel A' is raised or lowered to the work by sliding the arm C to the position required, and is secured by the tight screw C'.

The above description of operating the cutter will apply in a general way to the cutting or dressing of any kind of stones for the purposes mentioned. In some cases it might be desirable to place the stone to be cut on a carriage-way, so as to move it along under the rotary action of the cutter, as in the preparation of blocks for building purposes, &c.

In adapting my said invention to the dressing of millstones, it will be seen that the cutter-wheel A' is so connected with the arm of my said patented machine that it can be controlled by the several movements of the said arm, as explained in the specification thereof. Thus the cutter-wheel will conform itself to the lines required in any kind of dress.

The superior advantage of employing rotary cutting in forming the fine lines of a millstone dress is evident from the results obtained. In the first place, the lines are cut to any required depth, singly or in sets, by one motion of the cutter, and of uniform depth, and level throughout the entire surface of the stone, the cutter passing through hard and high spots alike. Such high spots are shown in Fig. 6, said figure being a vertical section of a portion of millstone, the dotted line $a'$ $b'$ representing the lower line of the cut, and $d'$ $d'$ $d'$ the high spots on its surface; secondly, the said lines, although deep, are left with solid, sharp, and unfractured edges throughout their whole length, and the spaces or lands between each line, however narrow, are left smooth and free from fracture, and the stone, at the completion of the said dressing, left in perfect face. These results are unattainable by any other process heretofore known. Another important item is the uniform, straight, and unbroken line of the "shear edge" of the furrow. This line is represented by the line $e f$, Fig. 5. This result is accomplished by the regular and precise action of the cutting-wheel when attached to the arm of my said patented machine. This cannot be done by the usual modes of dressing.

The general defect in millstone-dressing is want of perfect face. This arises from the imperfect manner employed in forming the dress, resulting in broken and irregular lines, fractured and splintered edges and lands. My arrangement entirely overcomes these deficiencies.

Dispatch is another feature of my said invention, the peculiar action of the cutter-wheel, as stated, being such that the dressing of a stone is effected with a rapidity unknown and unattainable by the old methods.

The perfection of face and superiority of dress, as already explained, will not only obviate the necessity of often dressing, but will materially increase the grinding capacity of the stones, and consequent yield of flour, and run with less power.

My mode of using the diamond—that is, by rotary motion—differs materially from the old way of using it by a right-line movement, relieving it entirely from strain or pressure. A diamond used in the latter way cannot be made to cut through hard and high spots, so that the bottom line of the cut shall present a perfectly straight line throughout its depth. The diamond-point encounters too much strain when such spots interpose, and must therefore be allowed to yield; hence the necessity of using a spring, in the old method, to "ease off the strain," as it is termed. This necessarily leaves the stone imperfectly faced. Again, the cut produced by a diamond thus operated is at best but faint and feeble, and, in the process of running, the stones are soon worn out.

To produce a cut such as made by my rotary cutter would require the diamond to be passed over the same line of cut an indefinite number of times.

What I claim, and desire to secure by Letters Patent, is—

1. The placing of a diamond or diamonds, or other hard cutting-points, on the periphery or sides of a wheel or disk, or anything equivalent thereto, and operating said wheel or disk at any required speed, by rotary motion or by rotary, rectilinear, and reciprocating motion simultaneously applied, as and for the purpose set forth.

2. The manner of rotating the cutter-wheel A' by means of the pulleys B, E, E', G, and H, also the mode of giving rectilinear and reciprocating motion to the said cutter-wheel by means of the divided nut U, screw K, bevel-wheels N, N', and O, pulleys S and H, vibrating hanger Q, and shipper-rod T, also the dovetailed arm C and tight screw C' for attaching said arm to the slide-block D and adjusting the cutter-wheel, the said several parts being combined, arranged, and operated substantially as shown, and for the purpose specified.

3. The mechanical parts for supporting and connecting the said rotary cutter, together with the parts for controlling its movements, as stated, to the arm of my patented millstone-dresser, herein referred to, so that the said cutter will conform to the position and movements of the said arm, as herein described, and for the purpose set forth.

JAMES T. GILMORE.

Witnesses:
J. F. S'NGLE,
T. ROCKWELL.